(12) United States Patent
Lin et al.

(10) Patent No.: US 12,001,641 B1
(45) Date of Patent: Jun. 4, 2024

(54) EMERGENCY RESPONSE SYSTEM

(71) Applicant: Taiwan Semiconductor Manufacturing Company Limited, Hsin-Chu (TW)

(72) Inventors: Adolph Lin, Taichung (TW); Jung Shiung Chen, Taichung (TW); Mao Rong Huang, Taichung (TW); Jet-Luen Shiu, Changhua County (TW); Che-Chuan Chi, Taichung (TW); Yi-Feng Hsieh, Changhua County (TW); Yen-Yu Chen, Taichung (TW)

(73) Assignee: Taiwan Semiconductor Manufacturing Company Limited, Hsin-Chu (TW)

( * ) Notice: Subject to any disclaimer, the term of this patent is extended or adjusted under 35 U.S.C. 154(b) by 0 days.

(21) Appl. No.: 18/122,296

(22) Filed: Mar. 16, 2023

(51) Int. Cl.
*G06F 3/0481* (2022.01)
*G06F 3/0488* (2022.01)
*G06Q 10/0631* (2023.01)
*G08B 17/00* (2006.01)
*G08B 21/12* (2006.01)

(52) U.S. Cl.
CPC .......... *G06F 3/0481* (2013.01); *G06F 3/0488* (2013.01); *G06Q 10/063112* (2013.01); *G08B 17/00* (2013.01); *G08B 21/12* (2013.01)

(58) Field of Classification Search
CPC ............ G08B 21/12–182; G08B 25/00; G08B 26/00; G08B 17/00; G06Q 10/063112; G06F 3/0481; G06F 3/0488
See application file for complete search history.

(56) References Cited

U.S. PATENT DOCUMENTS

| | | | |
|---|---|---|---|
| 9,898,912 B1* | 2/2018 | Jordan, II | H04L 12/2818 |
| 10,276,010 B2 | 4/2019 | Lee | |
| 2002/0135475 A1* | 9/2002 | Shih | G08B 21/12 |
| | | | 340/628 |
| 2016/0005229 A1* | 1/2016 | Lee | G06T 11/60 |
| | | | 345/419 |
| 2019/0279447 A1* | 9/2019 | Ricci | B60R 25/01 |
| 2022/0172600 A1* | 6/2022 | Klotz | G08B 25/14 |
| 2023/0071381 A1* | 3/2023 | Shao | G08B 31/00 |
| 2023/0273705 A1* | 8/2023 | Lin | G06T 11/001 |
| | | | 715/771 |

FOREIGN PATENT DOCUMENTS

| | | |
|---|---|---|
| CN | 113713311 A | 11/2021 |
| CN | 114997492 A | 9/2022 |
| CN | 115696094 A | 2/2023 |
| TW | M623133 U | 2/2022 |

* cited by examiner

*Primary Examiner* — Mong-Shune Chung
(74) *Attorney, Agent, or Firm* — Cooper Legal Group, LLC

(57) ABSTRACT

In some embodiments, a method is provided. The method includes identifying an incident situation based upon a sensor detecting an abnormal condition. One or more life safety systems are queried to obtain life safety system data. One or more databases, comprising equipment information, chemical information, personnel information, and/or emergency response contingency procedures, are queried to obtain on-site information. The life safety system data and the on-site information are integrated together to generate incident situation information. The incident situation information is displayed through an electronic display.

20 Claims, 11 Drawing Sheets

EMERGENCY RESPONSE SYSTEM

BACKGROUND

Many buildings and factories utilize life safety systems for detecting fires, earthquakes, gas leaks, or other dangerous situations.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
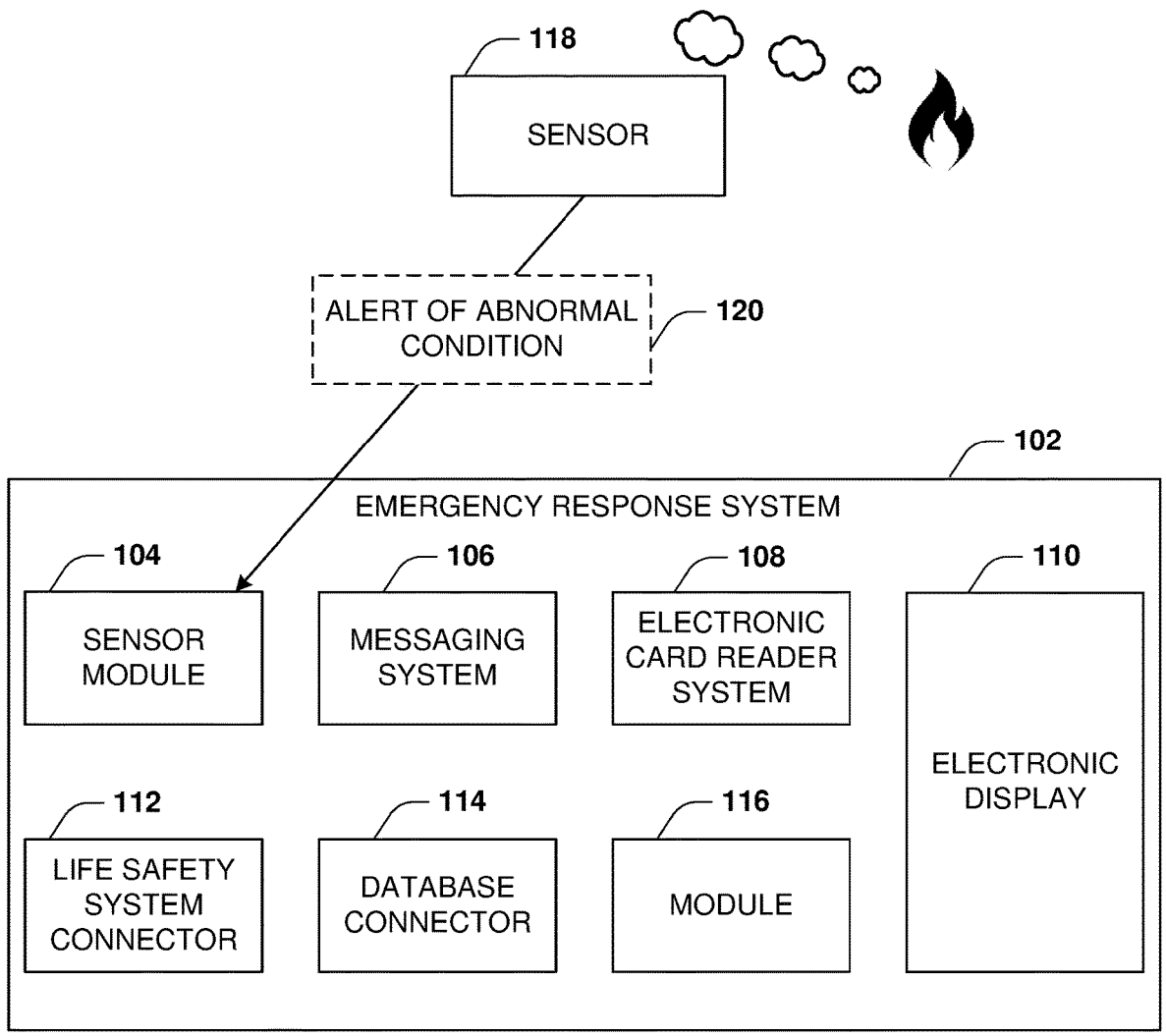
FIGS. 1A-1E illustrate an emergency response system, in accordance with some embodiments.

The following disclosure provides several different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals or letters in the various examples. This repetition is for the purpose of simplicity and clarity and does not in itself dictate a relationship between the various embodiments or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation illustrated in the figures. The apparatus may be otherwise oriented (rotated 90 degrees or at other orientations) and the spatially relative descriptors used herein may likewise be interpreted accordingly.

Incident situations can occur within factories, buildings, warehouses, and other locations. For a semiconductor fabrication facility, an incident situation could be a fire, a gas leak, a chemical spill, an earthquake, a power outage, etc. Various life safety systems are used to detect these abnormal situations. A fire alarm life safety system detects a fire based upon temperature and/or smoke. When the fire is detected, the fire alarm life safety system generates an alert such as by emitting an audible and/or visual alert in order to alert people in the area to evacuate the location. Similarly, when a gas monitoring life safety system detects a gas leak, the gas monitoring life safety system generates an audible and/or visual alert in order to alert people in the area to evacuate the location. Other types of life safety systems include earthquake life safety systems, chemical leak life safety systems, power supply life safety systems, etc.

During an incident situation such as a fire within the semiconductor fabrication facility, an emergency response process is implemented. As part of the emergency response process, an emergency response commander (e.g., a person designated to orchestrate the emergency response process) individually accesses and evaluates the various life safety systems of the semiconductor fabrication facility to understand the overall situation. The overall situation could relate to where there is merely an isolated fire, where the fire was caused by an earthquake, where the fire was caused by a gas leak explosion due to the earthquake, an identification of certain locations within the semiconductor fabrication facility that are affected by the incident situation, etc. Evaluating and correlating information across the various different life safety systems of the semiconductor fabrication facility is a difficult and time consuming manual process that reduces the efficiency of an overall emergency response process (e.g., adding 15 minutes to the overall emergency response process). Additional time is also spent by the emergency response commander to individually access and evaluate various different systems and databases in order to identify relevant emergency response contingency procedures, task checklists, and a map of the location affected by the incident situation. The emergency response commander also spends time accessing and evaluating the systems and databases to identify certifications and credentials of personnel in order to assign certain emergency response contingency procedures and tasks of the emergency response process to the appropriate personnel to perform. The emergency response commander additionally spends time accessing and evaluating the systems and database to identify chemicals and equipment at the location. The emergency response commander manually draws out checklists, flow charts, and personnel contacts in order to implement the emergency response process, which adversely affects the timeliness of the emergency response.

The techniques and systems provided herein improve the operation of life safety systems through an emergency response system that integrates life safety system data and on-site information to generate incident situation information displayed through an electronic display. Operation of the emergency response system is triggered in response to receiving a signal from a sensor indicating the detection of an abnormal condition, such as the detection of an abnormally large gas concentration within a particular location. In some embodiments, the sensor comprises a fire sensor, a gas sensor, a seismograph sensor, a chemical leak sensor, a power supply sensor, etc. The emergency response system identifies an incident situation, such as a gas leak incident situation at the location, based upon the sensor detecting the abnormal condition. In response to identifying the incident situation, the emergency response system is triggered to query one or more life safety systems to obtain relevant life safety system data. In some embodiments, the life safety system data includes gas concentration measurements retrieved from a gas monitoring life safety system, temperature measurements retrieved from a fire alarm life safety system, seismograph readings retrieved from an earthquake life safety system, power supply readings retrieved from a power supply life safety system, chemical concentration measurements retrieved from a chemical leak life safety system, etc. In some embodiments where the emergency response system is integrated into a life safety system, the emergency response system directly retrieves life safety system data from the life safety system. In some embodiments where the emergency response system is implemented by a computer separate from a life safety system, the emergency response system retrieves the life safety system data over a network from the life safety system.

The emergency response system is triggered to query one or more databases to obtain the on-site information. In some embodiments, the on-site information relates to equipment information describing equipment located at the location of the gas leak. In some embodiments, the on-site information relates to chemical and gas information of chemicals and gases maintained or used at the location of the gas leak. In some embodiments, the on-site information relates to personnel information such as certification and/or qualifications of personnel (e.g., a certification to handle a particular hazardous gas or chemical), contact information of personnel, and/or current locations of personnel (e.g., obtained from an electronic card reader system tracking personnel that use the electronic card reader system to gain access to certain locations). In some embodiments, the on-site information relates to emergency response contingency procedures and task checklists of procedures and tasks to perform as part of an emergency response process for the gas leak.

The emergency response system integrates the life safety system data and the on-site information to generate incident situation information. The incident situation information provides the emergency response commander with a single comprehensive and interactive view of the incident situation, such as a map of locations affected by the gas leak, information about equipment, gases, and chemicals maintained at the locations, emergency response contingency procedures and task checklists to perform for responding to the gas leak, personnel information of personnel qualified to perform the procedures and tasks, messaging functionality to transmit messages of task assignments to communication devices of the personnel, etc.

The emergency response system generates one or more user interface screens using the incident situation information. In some embodiments, a user interface screen includes a map populated with equipment information, chemical information, life safe system data measurements (e.g., temperature of a room, gas concentration in a room, etc.), an indicator of locations affected by the incident situation, etc. In some embodiments, a user interface screen includes video surveillance imagery of the locations affected by the incident situation. In some embodiments, a user interface screen includes details of chemicals and/or equipment at the locations affected by the incident situation, such as a material data sheets and equipment data sheets. In some embodiments, a user interface screen includes measurement trend charts, such as gas concentration trend charts, chemical concentration trend charts, temperature measurement trend charts, etc. In some embodiments, a user interface screen includes personnel information, such as contact information, certifications, qualifications, training, last known locations, and/or other information of personnel. In some embodiments, a user interface screen includes incident situation response procedures and task checklists to responding to the incident situation. In some embodiments, a user interface screen includes a recommendation of tasks to assign to certain personnel. In some embodiments where the emergency response system automatically generates task assignments and transmits messages of the task assignments to communication devices of personnel qualified to perform the tasks, the user interface screen is populated with the automatically generated task assignments and/or task progress updates communicated back by the personnel to the emergency response system. In some embodiments, a user interface screen is configured to accept user input in order to create on-site information records (e.g., a user may assign a task to a certain person, a user may create notes about the incident situation, etc.).

The emergency response system includes an electronic display. In some embodiments, the electronic display includes a single electronic touch panel, two electronic touch panels, or any other number of electronic touch panels. In some embodiments, one or more user interface screens are displayed on an electronic touch panel at a time. In some embodiments, a first user interface screen is displayed on a first electronic touch panel of the electronic display, and a second user interface screen is displayed on a second electronic touch panel of the electronic display. An electronic touch panel can be transitioned from displaying one user interface screen to displaying a different user interface screen based upon user input (e.g., a touch gesture, a button press, etc.).

The emergency response system is triggered to retrieve and integrate the life safety system data and the on-site information obtained from various different life safety systems and databases to automatically create incident situation information displayed through the electronic display in response to receiving an alert of an abnormal condition detected by a sensor. The incident situation information can be integrated into a map that provides users with a comprehensive visualization of a complete view of an incident situation and emergency response process to implement for the incident situation. This provides an emergency response commander with the ability to quickly make decisions for how to respond to the incident situation, thus improving the efficiency of implementing emergency response process (e.g., a reduction from 15 minutes to seconds). The emergency response system evaluates the incident situation information in order to generate recommendations of tasks to assign to personnel for responding to the incident situation. In some embodiments, the emergency response system automatically assigns tasks to personnel, notifies the personnel of the task assignments, and tracks task progress in order to quickly execute the emergency response process without waiting on manual intervention or instructions.

A messaging system (e.g., a short message service (SMS) module) is integrated into the emergency response system so that the emergency response system can automatically generate and transmit messages to communication devices of personnel (e.g., mobile phones), such as to convey tasks assignments and/or other key information to relevant personnel at appropriate times (e.g., when a task is to be performed), along with receiving back task progress information from the personnel. A user can utilize the electronic touch panel to quickly record on-site information and improve the timeliness of generating task progress updates to track the progress of tasks being performed. In some embodiments, the emergency response system is integrated into a life safety system in order to provide enhanced life safety system features that improve the operation of hardware and software of the life safety system. The operation of hardware of the life safety system is improved by the integration of new hardware features such as a messaging system (e.g., the SMS module) for communicating with emergency response personnel (e.g., assigning and tracking task progress) and an electronic card reader system that tracks emergency response personnel, confirms emergency response personnel qualifications, and automatically groups emergency response personnel for performing certain types of tasks for which the emergency response personnel are qualified to perform. The operation of software of the life safety system is improved by integrating life safety system data of the life safety system with on-site information obtained from external databases that track chemical information, equipment information, personnel information, and/or emergency response contingency procedures and task checklists so that the life safety system provides a comprehensive view of an incident situation and how to response to the incident situation. In this way, the emergency response system provides comprehensive decision making information and functionality for responding to incident situations.

FIGS. 1A-1E illustrate an emergency response system 102, in accordance with some embodiments.

Referring to FIG. 1A, the emergency response system 102 is configured to receive alert signals from sensors over a wired or wireless communication connection. The sensors can include fire sensors, gas sensors, seismograph sensors, chemical leak sensors, power supply sensors, and/or a wide range of sensors. In some embodiments, the emergency response system 102 is connected to a sensor 118 capable of detecting fires. In some embodiments, the emergency response system 102 comprises a sensor module 104 that is configured to receive and/or interpret alert signals received from the sensors. The sensor module 104 receives an alert signal 120 from the sensor 118 of an abnormal condition. The sensor module 104 is configured to interpret the alert signal 120 to determine that an incident situation is occurring (e.g., the alert signal 120 may indicate a temperature indicative of a particular type of fire). In some embodiments, the sensor module 104 may compare measurement information within the alert signal 120 to a data structure mapping measurements to incident situations. In some embodiments, the data structure maps temperature values to certain types of fire incident situations (e.g., a chemical fire, a grease fire, a non-chemical fire, etc.), chemical concentration values to chemical leakage situations for different chemical leakage amounts and/or toxicities, seismic measurements to earthquake incident situations of different magnitudes, gas measurement values to gas leakage incident situations for different gas leakage amounts and/or toxicities, etc.

Figure 1B:
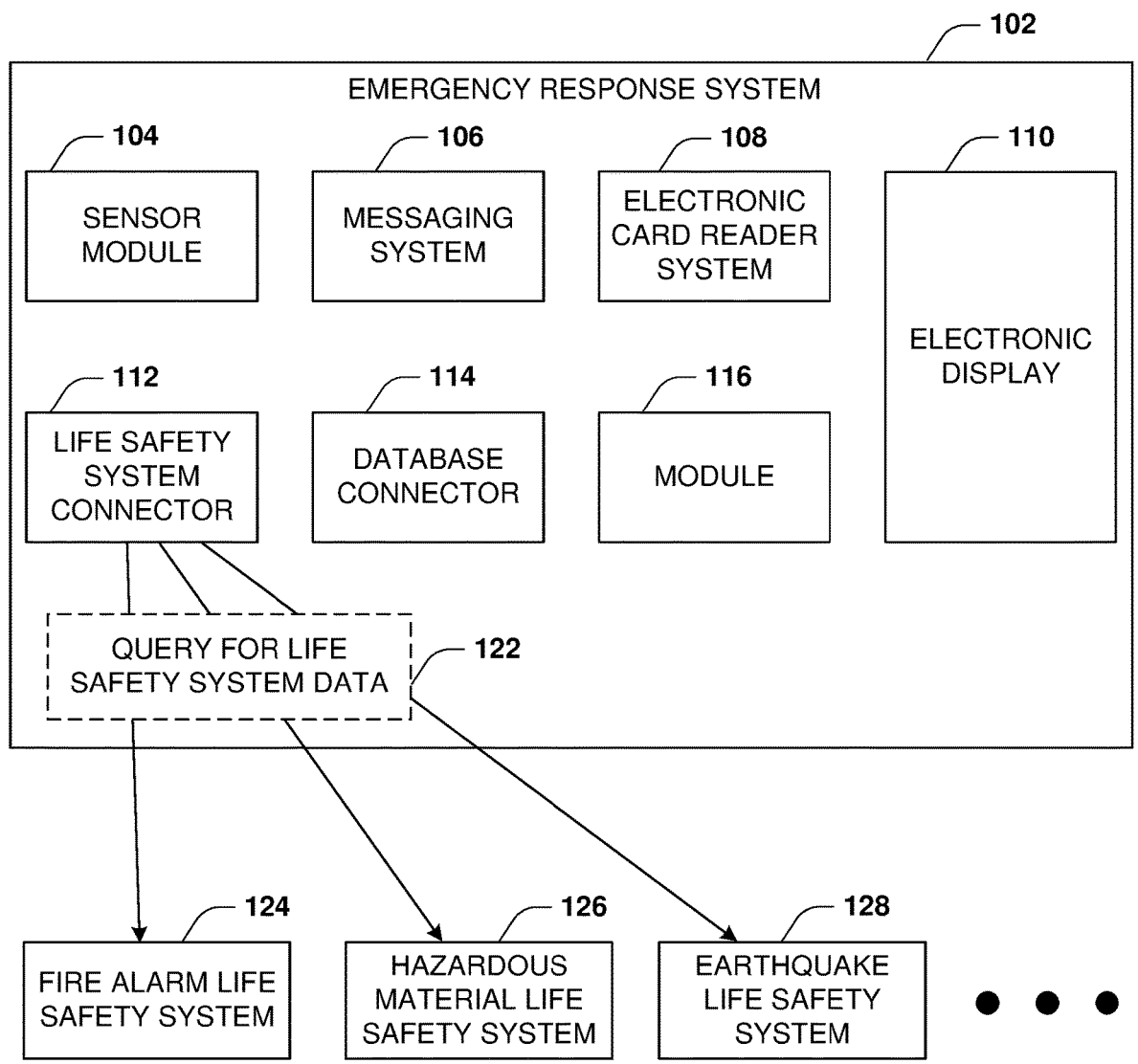

Referring to FIG. 1B, the sensor module 104 triggers a life safety system connector 112 of the emergency response system 102 to query 122 one or more life safety systems to obtain life safety system data 130. In some embodiments, the life safety system connector 112 queries a fire life safety system 124 to obtain fire alarm life safety system data that includes temperature measurements, measurement times of the temperature measurements, measurement locations of where the temperature measurements were obtained, and/or sensor information of sensors that obtained the temperature measurements. In some embodiments, the life safety system connector 112 queries a hazardous material life safety system 126 to obtain hazardous material life safety system data that includes hazardous material concentration measurements, measurement times of the hazardous material concentration measurements, measurement locations of where the hazardous material concentration measurements were obtained, and/or sensor information of sensors that obtained the hazardous material concentration measurements. In some embodiments, the life safety system connector 112 queries an earthquake life safety system 128 to obtain earthquake measurement life safety system data that includes seismic measurements, measurement times of the seismic measurements, measurement locations of where the seismic measurements were obtained, and/or sensor information of sensors that obtained the seismic measurements.

The life safety system connector 112 can query 122 other life safety systems, such as a gas leakage or chemical leakage life safety system, in order to obtain the life safety system data 130. In some embodiments where the emergency response system 102 is integrated into a life safety system, the life safety system connector 112 directly accesses storage within which life safety system data of the life safety system is stored. In some embodiments where the emergency response system 102 is external to a life safety system, the life safety system connector 112 transmits a request over a wired or wireless connection to the life safety system in order to retrieve the life safety system data. The life safety system data 130 provides an overview of what caused the incident situation and the extent of the incident situation such as where an earthquake caused a hazardous material leak and a fire at certain locations within a warehouse.

Figure 1C:
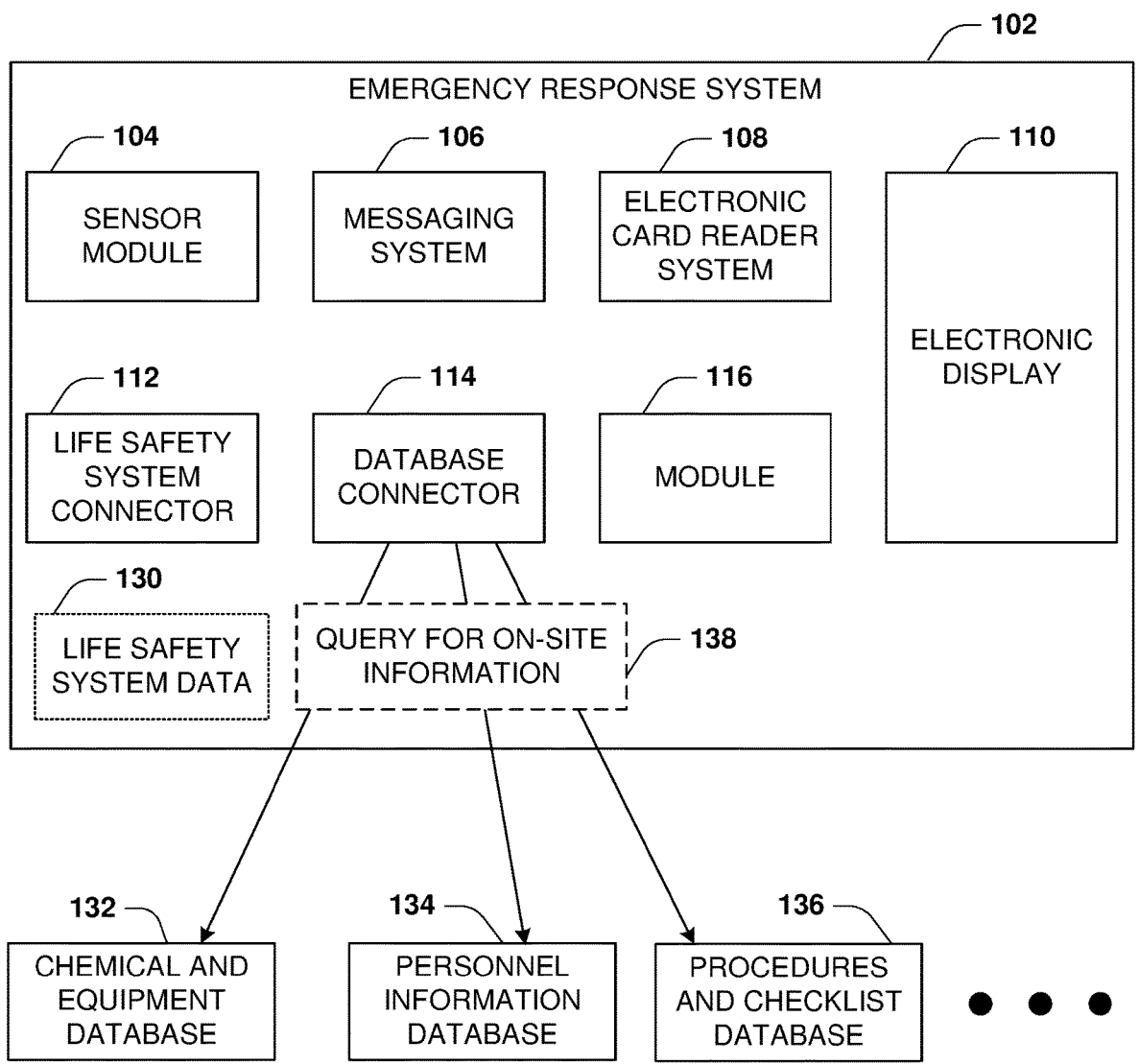

Referring to FIG. 1C, a database connector 114 of the emergency response system 102 is triggered to query 138 one or more databases for on-site information 140. In some embodiments, the database connector 114 queries a chemical and equipment database 132 to obtain the on-site information 140 about chemicals and equipment that are located at or near a location of the incident situation. In some embodiments, the on-site information 140 specifies a type of chemical, an amount of the chemical, a use of the chemical, and/or information about the chemical (e.g., a chemical material data sheet) that is located at or near rooms or areas affected by the fire, hazardous material leak, and/or earthquake. In some embodiments, the on-site information 140 specifies information about equipment (e.g., a type of equipment, a use of the equipment, an equipment manual, etc.) that is located at or near rooms or areas affected by the fire, hazardous material leak, and/or earthquake. In some embodiments, the database connector 114 queries a personnel information database 134 to obtain the on-site information 140 about personnel. In some embodiments, the on-site information 140 specifies contact information, qualifications and certifications (e.g., a certification to handle a certain toxic chemical, a certification to evacuate people during a fire, a certification to rescue people trapped from an earthquake, etc.), last known locations (e.g., a location of an electronic card reader system last used by a user to access a locked room), and/or other information about the personnel. In some embodiments, the database connector 114 queries a procedures and checklist database 136 to obtain the on-site information 140 about emergency response contingency procedures and task checklists of tasks to perform in response to certain incident situations. The on-site information 140 may specify a list of procedures and tasks to perform for a fire incident situation, a gas leak incident situation, a chemical leak incident situation, an earthquake incident situation, a power outage incident situation, etc.

Figure 1D:
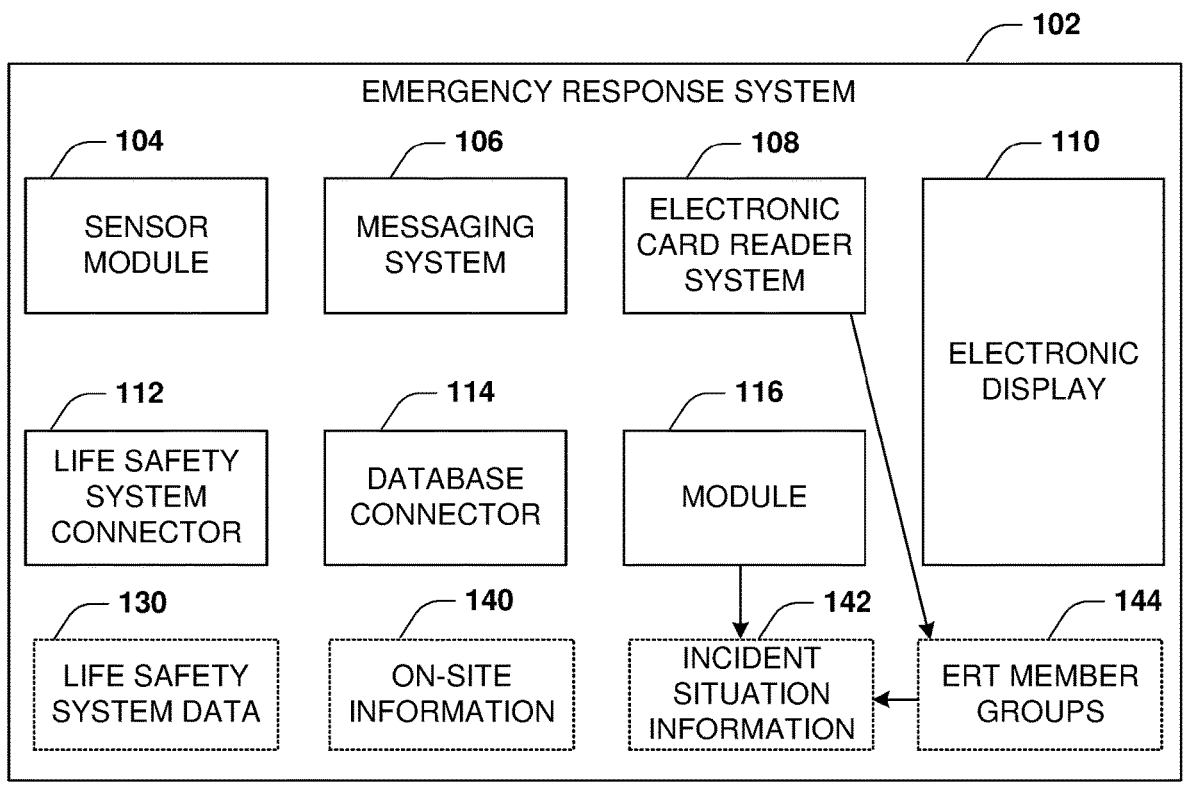

Referring to FIG. 1D, a module 116 of the emergency response system 102 is triggered to integrate the life safety system data 130 and the on-site information 140 together to create incident situation information 142. The incident situation information 142 correlates life safety system data 130 and the on-site information 140 in order to provide a comprehensive overview of the incident situation and/or to provide recommendations for implementing an emergency response process tailored to the incident situation. In some embodiments, the incident situation information 142 correlates chemical information within the life safety system data 130 (e.g., a particular toxic chemical has spilled) with personnel information within the incident situation information 142 (e.g., a particular person is certified to handle the toxic chemical), which can be used to generate a recommendation (e.g., assign the person to help contain the toxic chemical spill). In some embodiments, the incident situation information 142 correlates fire measurement information within the life safety system data 130 (e.g., temperature measurements indicative of a chemical fire) with emergency response contingency procedures within the incident situation information 142 to recommend a particular procedure and/or task checklist of tasks to perform as an emergency response procedure for the chemical fire. In some embodiments, the incident situation information 142 correlates seismic magnitude measurements within the life safety system data 130 to equipment data sheets within the incident situation information 142 to generate an indication of which equipment could be damaged or malfunction based upon the seismic magnitude measurements.

In some embodiments, the incident situation information 142 includes emergency response team member groups 144 derived from information extracted from an electronic card reader system 108 of the emergency response system 102. The electronic card reader system 108 may be in communication with one or more electronic card readers used to lock and unlock doors or other objects based upon authenticating personnel badges or other authentication such as passwords. If a user swipes or places a personnel badge within close proximity to an electronic card reader for a door, then the electronic card reader unlocks the door if the personnel badge indicates that the user has access to unlock the door. If the user does not have access to unlock the door, then the electronic card reader does not unlock the door. The electronic card reader system 108 collects information of times and locations of personnel, along with profile information of the personnel (e.g., personnel qualifications) based upon personnel badges being detected by electronic card readers. This information collected by the electronic card reader system 108 can be integrated into the incident situation information 142 to generate emergency response team member groups 144. In some embodiments, an emergency response team member group 144 is a grouping of personnel that are within a proximity distance to a location of the incident situation (e.g., within 1,000 feet or some other distance such that the personnel are able to reach the location in time to perform an emergency response task) and have certifications or other credentials indicating that the personnel are able to perform the emergency response task. In this way, the electronic card reader system 108 records personnel information such as last known locations of particular personnel, confirms personnel qualifications, and groups the personnel into the emergency response team member groups 144. In some embodiments, the emergency response team member groups 144 and other information within the incident situation information 142 may be automatically processed by the emergency response system 102 to assign emergency response tasks to personnel.

Figure 1E:
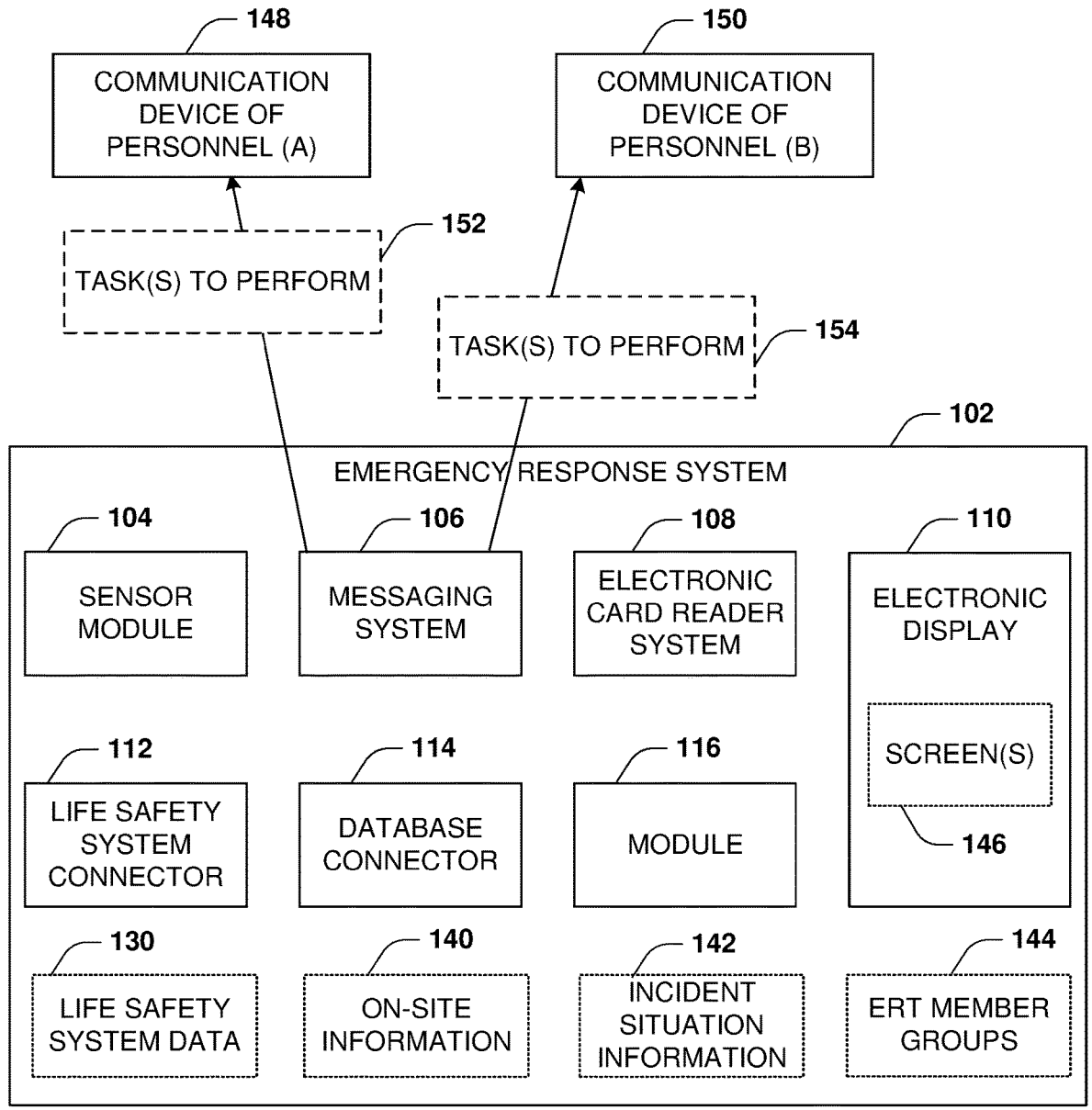

Referring to FIG. 1E, the emergency response system 102 includes a messaging system 106 such as an SMS system, an email system, or other system capable of transmitting electronic messages to computing devices. The messaging system 106 is configured to transmit messages to communication devices of personnel. In some embodiments, the messages specify emergency response tasks assigned to specific personnel to perform. In some embodiments, an emergency response task is assigned to personnel based upon user input through the emergency response system 102 for assigning the emergency response task to the personnel. In some embodiments, an emergency response task is automatically assigned to personnel by the emergency response system 102 based upon the emergency response team member groups 144 and other incident situation information 142. In this way, the emergency response system 102 automates the process of identify personnel and last known locations of the personnel, determining credentials indicative of what emergency response tasks can be performed by the personnel, assigning emergency response tasks to the personnel, and transmitting messages of the emergency response tasks to communication devices of the personnel. In some embodiments, the messaging system 106 transmits a first message 152 to a first communication device 148 (e.g., a mobile phone, a computer, a smart watch, etc.) of personnel (A). The first message 152 includes one or more emergency response tasks assigned to the personnel (A) to perform. In some embodiments, the messaging system 106 transmits a second message 154 to a second communication device 150 of personnel (B). The second message 154 includes one or more emergency response tasks assigned to the personnel (B) to perform.

The emergency response system 102 includes an electronic display 110. In some embodiments, the electronic display 110 includes a single electronic touch screen. In some embodiments, the electronic display 110 includes multiple electronic touch screens (e.g., two side-by-side electronic touch screens). The incident situation information 142 is displayed through the one or more electronic touch screens of the electronic display. The incident situation information 142 is used by the emergency response system 102 to generate user interface screens 146 that are displayed through the electronic display 110. Some embodiments of the user interface screens 146 are further described in relation to FIGS. 2A-2C.

Figure 2A:
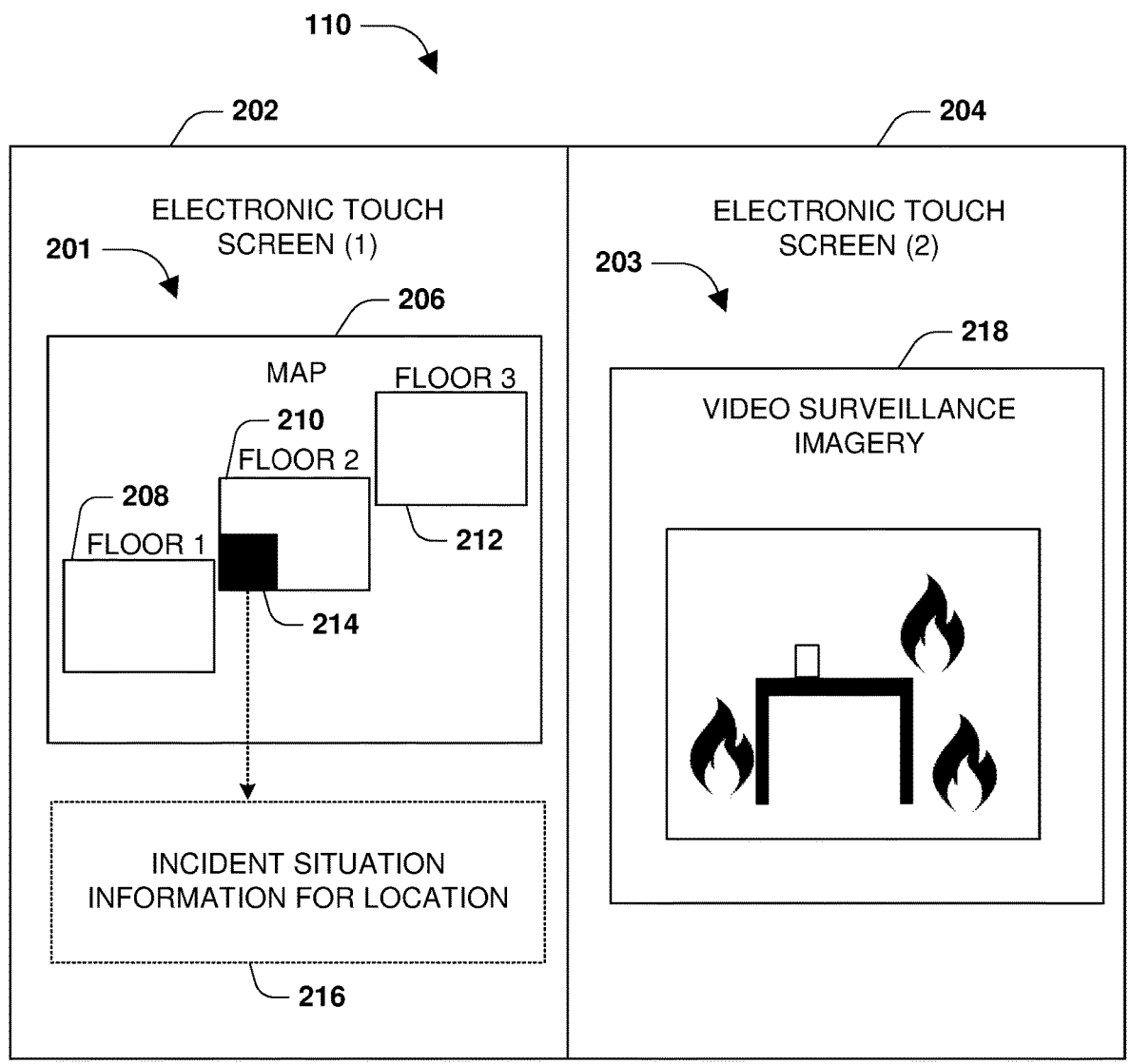
FIGS. 2A-2C illustrate an electronic display of an emergency response system, in accordance with some embodiments.

Referring to FIG. 2A, the electronic display 110 comprises a first electronic touch screen 202 and a second electronic touch screen 204. The emergency response system 102 creates a first user interface screen 201 that is displayed on the first electronic touch screen 202. The first user interface screen 201 is populated with a map 206 that is generated by the emergency response system 102 using the incident situation information 142. In some embodiments, the on-site information 140 within the incident situation information 142 includes a map layout for a fabrication facility that includes three floors. The map layout includes a first floor representation 208, a second floor representation 210, and a third floor representation 212 of the three floors of the fabrication facility. The emergency response system 102 uses the map layout to construct the map 206 populated within the first user interface screen 201.

Various information is integrated into the map 206. In some embodiments, equipment locations, chemical locations, last known personnel locations, detected fire locations, detected chemical spill locations, detected gas leak locations, and/or other information is labeled within the map 206. In some embodiments, a location representation 214 of a location of a fire on the second floor is populated within the second floor representation 210 of the map 206. A display property of the location representation 214 is modified (e.g., highlighted red or some other color, bolded, labeled with a text label, etc.) to indicate that a fire has been detected at the location. In some embodiments, different display properties such as different colors may be used to indicate different information such as a first color for a fire, a second color for a chemical spill, a third color for a gas leak, etc. In response to user input, with the location representation 214, being detected by the first electronic touch screen 202, a subset of incident situation information 216 related to the location represented by the location representation 214 is populated within the first user interface screen 201, such as information about equipment, chemicals, and personnel located at the location represented by the location representation 214.

The emergency response system 102 creates a second user interface screen 203 that is displayed on the second electronic touch screen 204. The second user interface screen 203 is populated with video surveillance imagery 218. The emergency response system 102 connects to a video surveillance system of video cameras that capture video surveillance imagery (e.g., closed-circuit television). The emergency response system 102 identifies a video camera of the video surveillance system that is located at or near a location affected by the incident situation, such as the location of the fire. Accordingly, the emergency response system 102 obtains the video surveillance imagery, captured by the video camera, from the video surveillance system, which is displayed as the video surveillance imagery 218. The video surveillance imagery 218 is provided as a video that is updated, such as in real-time, as the video camera captures video surveillance imagery over time.

Figure 2B:
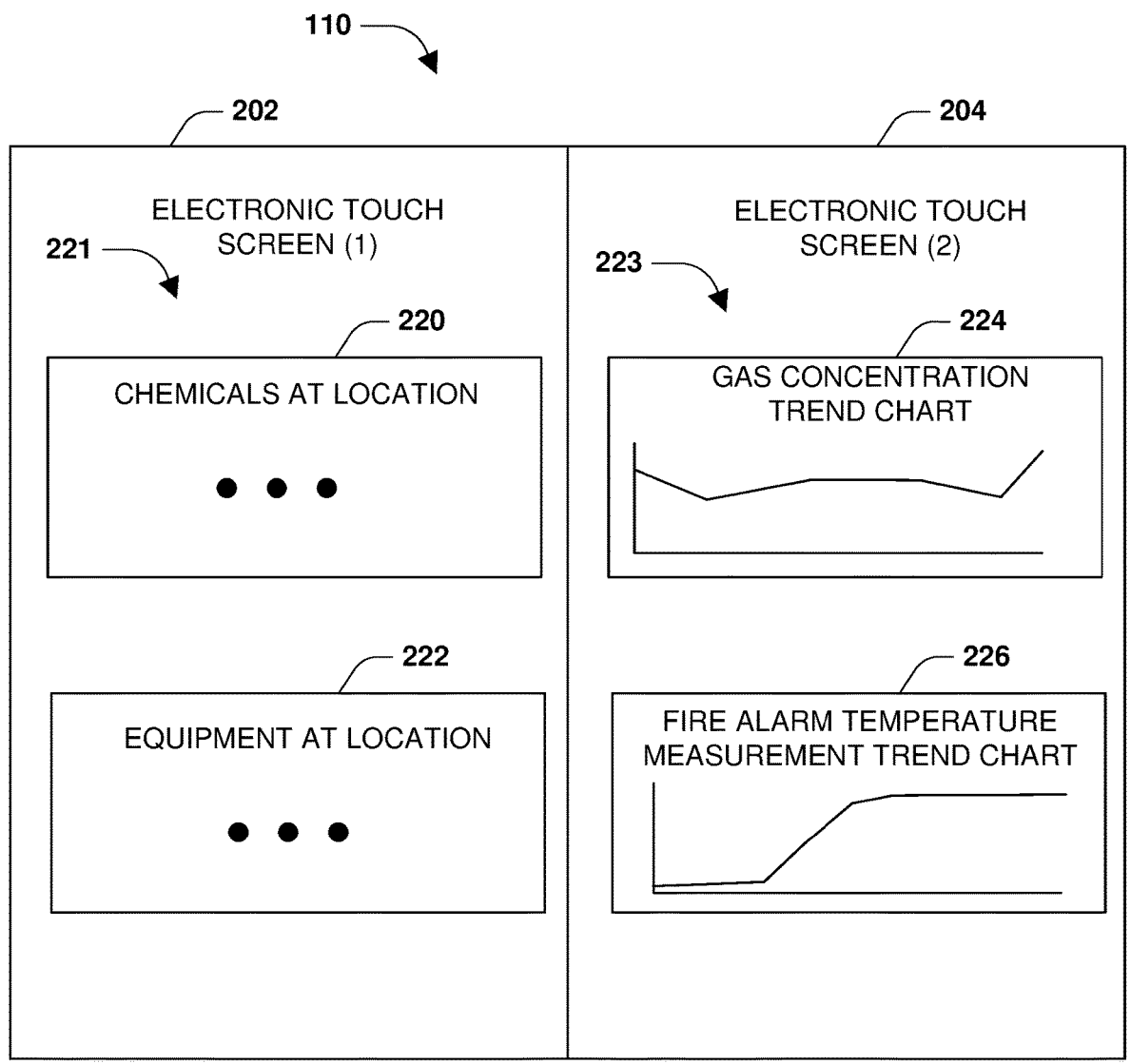

Referring to FIG. 2B, the first electronic touch screen 202 is populated with a third user interface screen 221. In some embodiments, the third user interface screen 221 is displayed on the first electronic touch screen 202 to replace the first user interface screen 201 based upon user input (e.g., a swipe gesture on the first electronic touch screen 202, a selection of the third user interface screen 221 from a list of available user interface screens, etc.). The emergency response system 102 populates the third user interface screen 221 with a list of chemicals 220 that are located at or near a location affected by the incident situation, such as the location of the fire. The list of chemicals 220 are identified from the on-site information 140 within the incident situation information 142. In response to the emergency response system 102 receiving user input through the third user interface screen 221 that selects a chemical from the list of chemicals 220, the emergency response system 102 populates the first electronic touch screen 202 with information about the chemical, such as a chemical data sheet.

The emergency response system 102 populates the third user interface screen 221 with a list of equipment 222 that is located at or near a location affected by the incident situation, such as the location of the fire. The list of equipment 222 is identified from the on-site information 140 within the incident situation information 142. In response to the emergency response system 102 receiving user input through the third user interface screen 221 that selects a piece of equipment from the list of equipment 222, the emergency response system 102 populates the first electronic touch screen 202 with information about the piece of equipment, such as a manual for the piece of equipment.

The second electronic touch screen 204 is populated with a fourth user interface screen 223. In some embodiments, the fourth user interface screen 223 is displayed on the second electronic touch screen 204 to replace the second user interface screen 203 based upon user input (e.g., a swipe gesture on the second electronic touch screen 204, a selection of the fourth user interface screen 223 from a list of available user interface screens, etc.). The emergency response system 102 populates the fourth user interface screen 223 with a gas concentration trend chart 224. The emergency response system 102 evaluates the life safety system data 130 within the incident situation information 142 to identify gas measurements for a location affected by the incident situation, such as the location of the fire. The emergency response system 102 identifies a gas concentration trend based upon the gas measurements. The emergency response system 102 generates the gas concentration trend chart 224 based upon the gas concentration trend, which is populated within the fourth user interface screen 223.

The emergency response system 102 populates the fourth user interface screen 223 with a fire alarm temperature measurement trend chart 226. The emergency response system 102 evaluates the life safety system data 130 within the incident situation information 142 to identify temperature measurements for a location affected by the incident situation, such as the location of the fire. The emergency response system 102 identifies a fire alarm temperature measurement trend based upon the temperature measurements. The emergency response system 102 generates the fire alarm temperature measurement trend chart 226 based upon the fire alarm temperature measurement trend, which is populated within the fourth user interface screen 223.

Figure 2C:
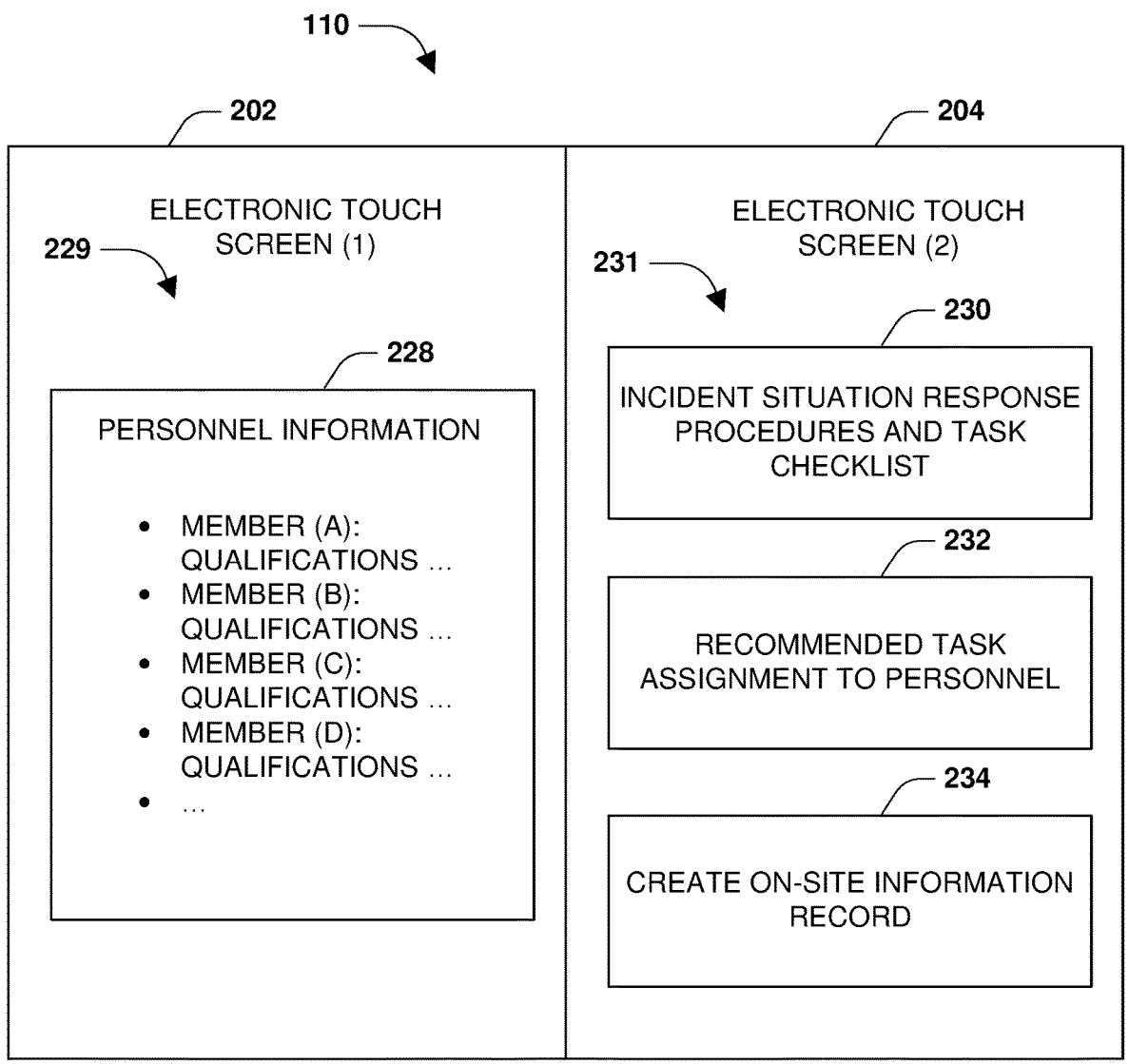

Referring to FIG. 2C, the first electronic touch screen 202 is populated with a fifth user interface screen 229. In some embodiments, the fifth user interface screen 229 is displayed on the first electronic touch screen 202 to replace the third user interface screen 221 based upon user input (e.g., a swipe gesture on the first electronic touch screen 202, a selection of the fifth user interface screen 229 from a list of available user interface screens, etc.). The emergency response system 102 populates the fifth user interface screen 229 with personnel information 228 extracted from the on-site information 140 and/or the emergency response team member groups 144 within the incident situation information 142. The personnel information 228 lists contact information for personnel, qualifications (e.g., certifications and training) of personnel for performing tasks associated with implementing an emergency response process for the incident situation, last known locations of the personnel, etc. In some embodiments, the personnel information 228 can be filtered based upon various filter criteria, such as by filtering out personnel lacking qualifications for performing a particular task associated with implementing the emergency response process for the incident situation or filtering out personnel that are not located within a particular proximity to a location of the incident situation (e.g., personnel not currently located at the fabrication facility).

The second electronic touch screen 204 is populated with a sixth user interface screen 231. In some embodiments, the sixth user interface screen 231 is displayed on the second electronic touch screen 204 to replace the fourth user interface screen 223 based upon user input (e.g., a swipe gesture on the second electronic touch screen 204, a selection of the sixth user interface screen 231 from a list of available user interface screens, etc.). The emergency response system 102 populates the sixth user interface screen 231 with incident situation response procedures and task checklist 230 derived from the incident situation information 142. The emergency response system 102 identifies the incident situation response procedures and task checklist 230 based upon the incident situation information 142 specifying that emergency response process for the incident situation is to include certain procedures and tasks, which the emergency response system 102 populates within the incident situation response procedures and task checklist 230.

The emergency response system 102 populates the sixth user interface screen 231 with recommended task assignments 232 for personnel identified as emergency response team members having qualifications for performing tasks associated with the incident situation response procedures and task checklist 230. The emergency response system 102 matches qualifications (e.g., certifications, training, etc.) of personnel with tasks specified by the incident situation response procedures and task checklist 230 to identify the emergency response team members, and automatically recommends task assignments for the emergency response team members as the recommended task assignments 232. In some embodiments, the messaging system 106 of the emergency response system 102 is used to transmit messages of task assignments within the recommended task assignments 232 to communication devices of corresponding emergency response team members.

The emergency response system 102 populates the sixth user interface screen 231 with a user interface 234 through which a user can create on-site information records. In some embodiments, the on-site information records correspond to an assignment of a task to an emergency response team member, a task completion progress update for a task, an update to information displayed through one or more of the user interface screens, an update to information stored within the incident situation information 142, etc. If the user input corresponds to the assignment of a task to an emergency response team member, the emergency response system 102 is triggered to control the messaging system 106 to transmit a message of the task to a communication device of the emergency response team member.

Figure 3:
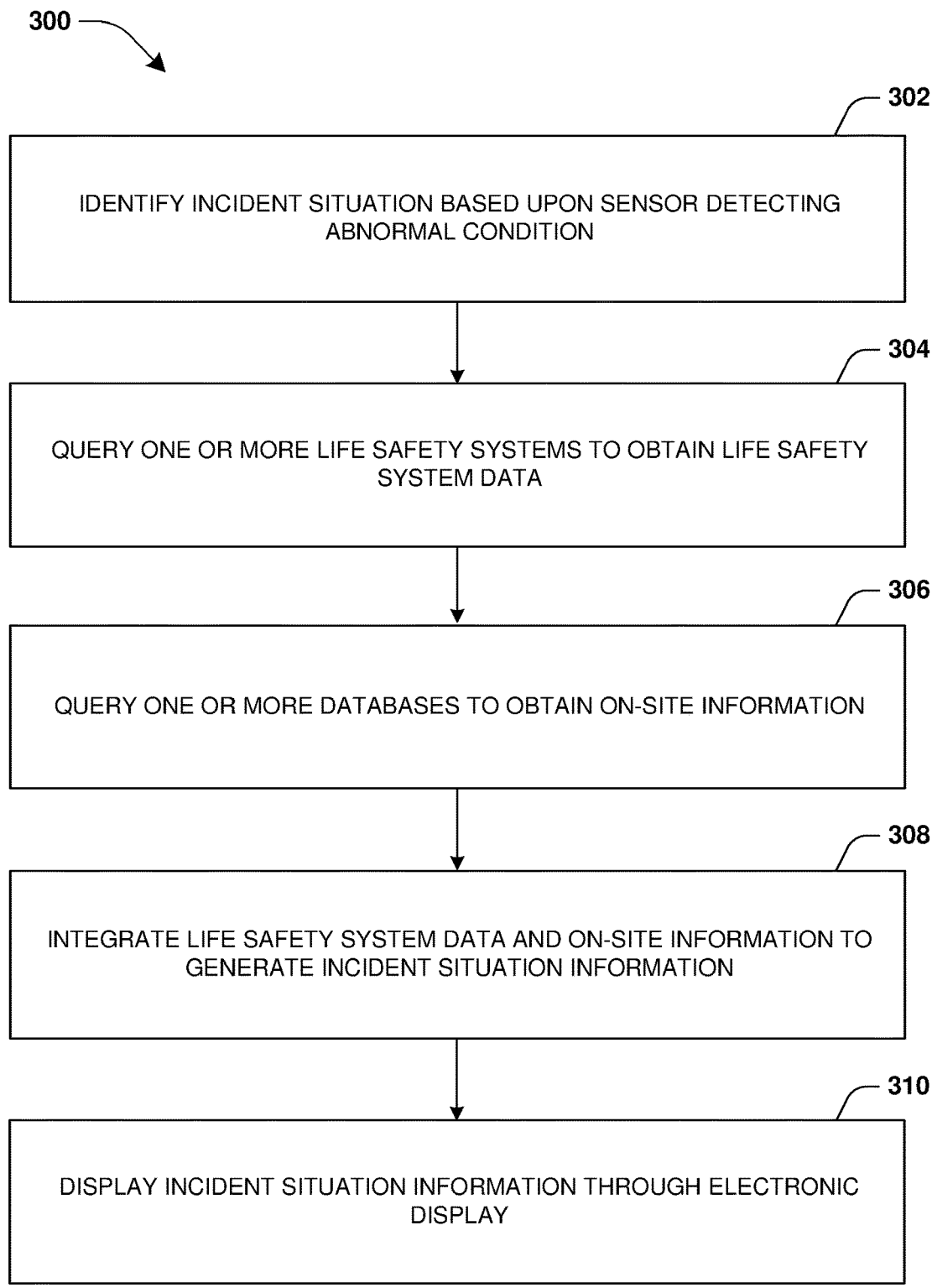
FIG. 3 is an illustration of a method of generating and providing incident situation information, according to some embodiments.

FIG. 3 is an illustration of a method 300 of generating and providing incident situation information, according to some embodiments. In some embodiments, the method 300 is implemented by the emergency response system 102. During operation 302 of method 300, an incident situation is identified based upon a sensor detecting an abnormal condition. In some embodiments, the abnormal condition corresponds to the sensor detecting measurements indicative of a fire, a gas leak, an earthquake, a chemical spill, or other incident situations. During operation 304 of method 300, one or more life safety systems are queried to obtain life safety system data. In some embodiments, the life safety system data corresponds to data provided by a fire alarm life safety system (e.g., a location of a fire alarm that has been triggered, temperature measurements, sprinklers that have been triggered, times and locations of measurements and triggering events, etc.), data provided by an earthquake life safety system (e.g., a time, location, duration, and magnitude of detected seismic activity), data provided by an alarm life safety system (e.g., a triggering event for an alarm, a location of the alarm, a duration of the alarm being triggered, etc.), data provided by a power supply life safety system (e.g., a triggering event for a power failure, a location of the power failure, a duration of the power failure, etc.), and/or other data from other types of life safety systems.

During operation 306 of method 300, one or more databases are queried to obtain on-site information. In some embodiments, the on-site information comprises chemical information (e.g., locations and quantities of chemicals, chemical data sheets, instructions on how to handle chemical spill cleanup, chemical transportation and handling instructions, certifications and qualifications required to handle chemical spill cleanup, etc.). In some embodiments, the on-site information comprises equipment information (e.g., locations of equipment, equipment manuals, certifications and qualifications required for operating the equipment, etc.). In some embodiments, the on-site information comprises personnel training database data (e.g., certifications, qualifications, and training of personnel). In some embodiments, the on-site information comprises various emergency response contingency procedures and checklists.

During operation 308 of method 300, the life safety system data is integrated with the on-site information to generate incident situation information. In some embodiments, information within the life safety system data (e.g., a detected chemical spill in a particular location) is correlated with the on-site information (e.g., personnel qualifications, last known personnel locations indicated by the electronic card reader system 108, chemical spill cleanup procedures and tasks for the type of chemical that was spilled, a chemical data sheet, etc.) to generate the incident situation information tailored for implementing an emergency response to the particular incident situation (e.g., identification of personnel that is qualified to clean up the chemical spill and is located within a certain proximity to the chemical spill, along with a recommended task to be performed by the personnel). During operation 310 of method 300, the incident situation information is displayed through an electronic display 110. In some embodiments, the incident situation information is used to generate one or more user interface screens that are displayed on one or more electronic touch screens of the electronic display 110.

Figure 4:
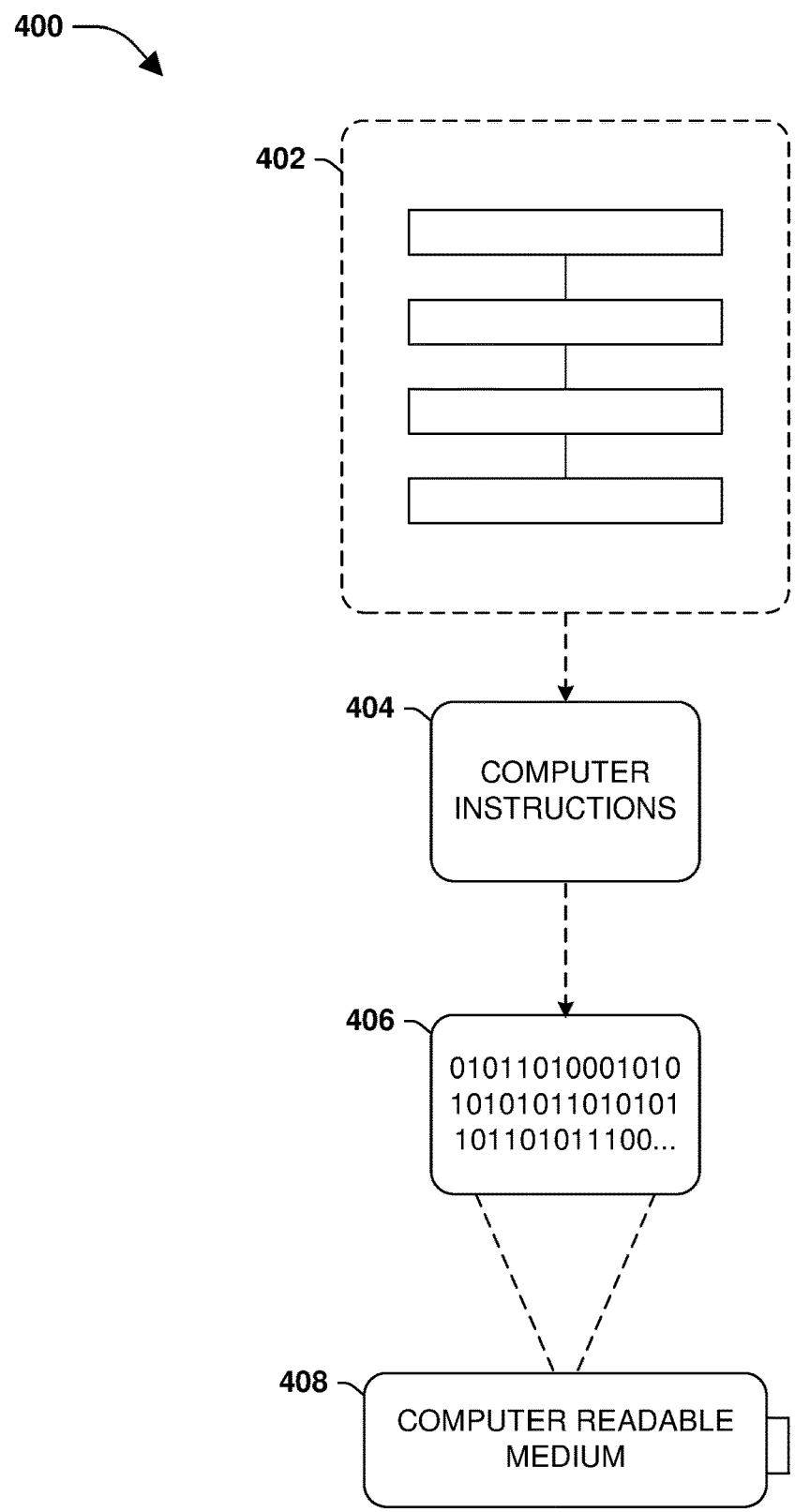
FIG. 4 illustrates an example computer-readable medium wherein processor-executable instructions configured to embody one or more of the provisions set forth herein may be comprised, according to some embodiments.

One or more embodiments involve a computer-readable medium comprising processor-executable instructions configured to implement one or more of the techniques presented herein. An exemplary computer-readable medium is illustrated in FIG. 4, wherein the embodiment 400 comprises a computer-readable medium 408 (e.g., a CD-R, DVD-R, flash drive, a platter of a hard disk drive, etc.), on which is encoded computer-readable data 406. This computer-readable data 406 in turn comprises a set of processor-executable computer instructions 404 configured to implement one or more of the principles set forth herein when executed by a processor. In some embodiments 400, the processor-executable computer instructions 404 are configured to implement a method 402, such as at least some of the aforementioned method(s) when executed by a processor. In some embodiments, the processor-executable computer instructions 404 are configured to implement a system, such as at least some of the one or more aforementioned system(s) when executed by a processor. Many such computer-readable media may be devised by those of ordinary skill in the art that are configured to operate in accordance with the techniques presented herein.

Figure 5:
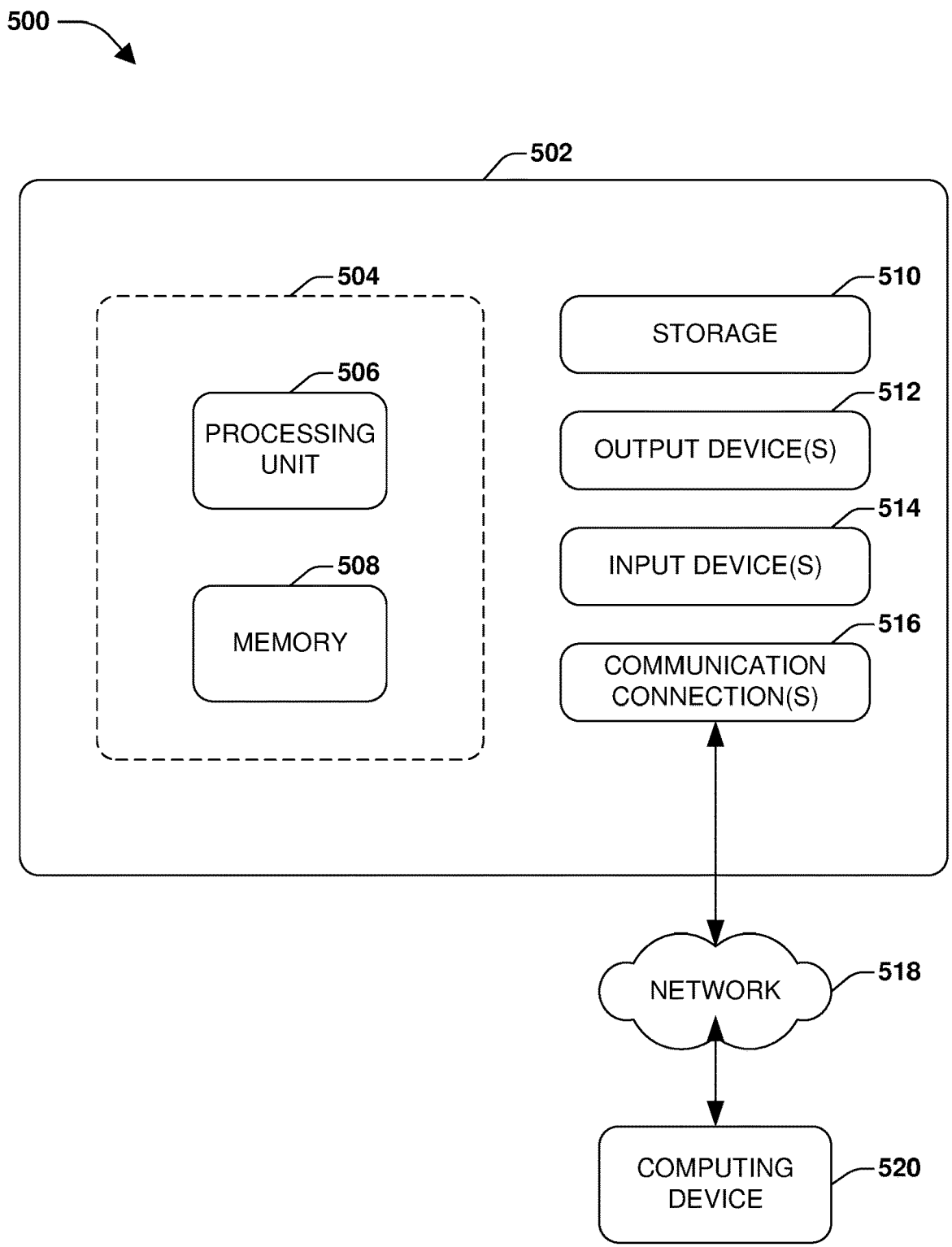
FIG. 5 illustrates an example computing environment wherein one or more of the provisions set forth herein may be implemented, according to some embodiments.

FIG. 5 illustrates an example computing environment wherein one or more of the provisions set forth herein may be implemented, according to some embodiments. FIG. 5 and the following discussion provide a brief, general description of a suitable computing environment to implement embodiments of one or more of the provisions set forth herein. The computing environment of FIG. 5 is only one example of a suitable computing environment and is not intended to suggest any limitation as to the scope of use or functionality of the computing environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 5 depicts an example of a system 500 comprising a computing device 502 configured as a controller to implement embodiments provided herein. In some configurations, the computing device 502 includes at least one processing unit 506 and memory 508. Depending on the exact configuration and type of computing device, memory 508 may be volatile (such as random-access memory (RAM), for example), non-volatile (such as read-only memory (ROM), flash memory, etc., for example), or some combination of the two. This configuration is illustrated in FIG. 5 by dashed line 504.

In some embodiments, the computing device 502 may include additional features and/or functionality. For example, computing device 502 may also include additional storage (e.g., removable and/or non-removable) including, but not limited to, magnetic storage, optical storage, and the like. Such additional storage is illustrated in FIG. 5 by storage 510. In some embodiments, computer readable instructions to implement one or more embodiments provided herein may be in the storage 510. The storage 510 may also store other computer readable instructions to implement an operating system, an application program, and the like. Computer readable instructions may be loaded in the memory 508 for execution by the processing unit 506, for example.

The term "computer readable media" as used herein includes computer storage media. Computer storage media includes volatile and nonvolatile, removable and non-removable media implemented in any method or technology for storage of information such as computer readable instructions or other data. The memory 508 and the storage 510 are examples of computer storage media. Computer storage media includes, but is not limited to, RAM, ROM, electrically erasable programmable read-only memory (EEPROM), flash memory, or other memory technology, CD-ROM, Digital Versatile Disks (DVDs), or other optical storage, magnetic cassettes, magnetic tape, magnetic disk storage, or other magnetic storage devices, or any other medium which can be used to store the desired information and which can be accessed by the computing device 502. Any such computer storage media may be part of the computing device 502.

The computing device 502 may also include communication connection(s) 516 that allows the computing device 502 to communicate with other devices. The communication connection(s) 516 may include, but is not limited to, a modem, a Network Interface Card (NIC), an integrated network interface, a radio frequency transmitter/receiver, an infrared port, a universal serial bus (USB) connection, or other interfaces for connecting the computing device 502 to other computing devices. The communication connection(s) 516 may include a wired connection or a wireless connection. The communication connection(s) 516 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

The computing device 502 may include input device(s) 514 such as keyboard, mouse, pen, voice input device, touch input device, infrared cameras, video input devices, and/or any other input device. Output device(s) 512 such as one or more displays, speakers, printers, and/or any other output device may also be included in the computing device 502. The input device(s) 514 and the output device(s) 512 may be connected to the computing device 502 via a wired connection, wireless connection, or any combination thereof. In some embodiments, an input device or an output device from another computing device may be used as the input device(s) 514 or the output device(s) 512 for the computing device 502.

Components of the computing device 502 may be connected by various interconnects, such as a bus. Such interconnects may include a Peripheral Component Interconnect (PCI), such as PCI Express, USB, firewire (IEEE 1394), an optical bus structure, and the like. In some embodiments, components of the computing device 502 may be interconnected by a network. For example, the memory 508 may be comprised of multiple physical memory units located in different physical locations interconnected by a network.

Those skilled in the art will realize that storage devices utilized to store computer readable instructions may be distributed across a network. For example, a second computing device 520 accessible via a network 518 may store computer readable instructions to implement one or more embodiments provided herein. The computing device 502 may access the second computing device 520 and download a part or all of the computer readable instructions for execution. Alternatively, the computing device 502 may download pieces of the computer readable instructions, as needed, or some instructions may be executed at the computing device 502 and some at the second computing device 520.

As disclosed, the emergency response system integrates life safety system data and on-site information obtained from various different life safety systems and databases to automatically create incident situation information displayed through the electronic display. The incident situation information can be integrated into a map or other visualization that provides users with a comprehensive visualization of a complete view of an incident situation and emergency response process to implement for the incident situation. This provides an emergency response commander with the ability to quickly make decisions for how to respond to the incident situation, thus improving the efficiency of implementing emergency response process (e.g., a reduction from 15 minutes to seconds). The emergency response system evaluates the incident situation information in order to generate recommendations of tasks to assign to personnel for responding to the incident situation. In some embodiments, the emergency response system automatically assigns tasks to personnel, notifies the personnel of the task assignments, and tracks task progress in order to quickly execute the emergency response process without waiting on manual intervention or instructions. The emergency response system is integrated with a messaging system so that the emergency response system can automatically generate and transmit messages to communication devices of personnel, such as to convey tasks assignments to the personnel and/or other key information to relevant personnel at appropriate times. A user can utilize the electronic touch panel to quickly record on-site information and improve the timeliness of updating progress of checklists and procedures.

In some embodiments, the emergency response system is integrated into a life safety system in order to provide enhanced life safety system features that improve the operation of hardware and software of the life safety system. The operation of hardware of the life safety system is improved by the integration of new hardware features such as a messaging system for communicating with emergency response personnel and an electronic card reader system that tracks emergency response personnel, confirms emergency response personnel qualifications, and automatically groups emergency response personnel for performing certain types of tasks for which the emergency response personnel are qualified to perform. The operation of software of the life safety system is improved by integrating life safety system data of the life safety system with on-site information obtained from external databases that track chemical information, equipment information, personnel information, and/or emergency response contingency procedures and task checklists so that the life safety system provides a comprehensive view of an incident situation and how to response to the incident situation. In this way, the emergency response system provides comprehensive decision making information and functionality for responding to incident situation In some embodiments, a method is provided. The method includes identifying an incident situation based upon a sensor detecting an abnormal condition. One or more life safety systems are queried to obtain life safety system data. One or more databases, comprising equipment information, chemical information, personnel information, and/or emergency response contingency procedures, are queried to obtain on-site information. The life safety system data and the on-site information are integrated together to generate incident situation information. The incident situation information is displayed through an electronic display In some embodiments, a system is provided. The system includes a sensor module that identifies an incident situation based upon receiving an indication from a sensor that an abnormal condition has been detected by the sensor. A life safety system connector queries one or more life safety systems to obtain life safety system data. A database connector queries one or more databases, comprising at least one of equipment information, chemical information, personnel information, or emergency response contingency procedures, to obtain on-site information. A module integrates the life safety system data and the on-site information to generate incident situation information. An electronic display is used to display the incident situation information.

In some embodiments, a non-transitory machine readable medium, comprising instructions for performing a method, is provided. The method includes obtaining life safety system data and on-site information associated with an incident situation in response to detecting the incident situation. The life safety system data and the on-site information are integrated to generate incident situation information. The incident situation information is utilized to construct a plurality of user interface screens that can be displayed through an electronic touch screen based upon user input navigating amongst the plurality of user interface screens. One or more of the user interface screens are displayed through the electronic touch screen.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

It will be appreciated that layers, features, elements, etc. depicted herein are illustrated with particular dimensions relative to one another, such as structural dimensions or orientations, for example, for purposes of simplicity and ease of understanding and that actual dimensions of the same differ substantially from that illustrated herein, in some embodiments. Additionally, a variety of techniques exist for forming the layers, regions, features, elements, etc. mentioned herein, such as at least one of etching techniques, planarization techniques, implanting techniques, doping techniques, spin-on techniques, sputtering techniques, growth techniques, or deposition techniques such as chemical vapor deposition (CVD), for example.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   identifying an incident situation based upon a sensor detecting an abnormal condition;
   querying one or more life safety systems to obtain life safety system data;
   querying one or more databases, comprising at least one of equipment information, chemical information, personnel information, or emergency response contingency procedures, to obtain on-site information;
   integrating the life safety system data and the on-site information to generate incident situation information; and
   displaying the incident situation information through an electronic display.

2. The method of claim 1, comprising:
   populating a map, displayed through the electronic display, with a plurality of location representations;
   evaluating the incident situation information to identify a location of the incident situation;
   modifying a display property of a location representation, of the location, within the map; and
   in response to receiving user input with respect to the location representation, displaying a subset of the incident situation information related to the location.

3. The method of claim 1, comprising:
   populating the electronic display with video surveillance imagery of a location associated with the incident situation.

4. The method of claim 1, comprising:
   evaluating the incident situation information to identify a location of the incident situation and chemical information of chemicals used at the location; and
   populating the electronic display with the chemical information of the chemicals.

5. The method of claim 1, comprising:
   evaluating the incident situation information to identify a location of the incident situation and equipment information of equipment used at the location; and
   populating the electronic display with the equipment information of the equipment.

6. The method of claim 1, comprising:
   evaluating the incident situation information to identify a gas concentration trend;
   generating a gas concentration trend chart based upon the gas concentration trend; and
   populating the electronic display with the gas concentration trend chart.

7. The method of claim 1, comprising:
   evaluating the incident situation information to identify a fire alarm temperature measurement trend;
   generating a fire alarm temperature measurement trend chart based upon the fire alarm temperature measurement trend; and
   populating the electronic display with the fire alarm temperature measurement trend chart.

8. The method of claim 1, comprising:
   evaluating the incident situation information to identify an incident situation response procedure and task checklist to perform as a response to the incident situation; and
   populating the electronic display with the incident situation response procedure and task checklist.

9. The method of claim 8, comprising:
   evaluating the incident situation information to identify a set of emergency response team members having qualifications for performing tasks associated with the incident situation response procedure and task checklist; and
   populating the electronic display with recommended task assignments for the set of emergency response team members.

10. The method of claim 9, comprising:
    controlling a messaging system to transmit messages of the recommended task assignments to communication devices of the set of emergency response team members.

11. The method of claim 9, comprising:
    in response to receiving user input through the electronic display, generating a record of on-site information.

12. The method of claim 1, comprising:
    in response to receiving user input through the electronic display, generating a record of an assignment of a task to an emergency response team member; and
    controlling a messaging system to transmit a message, of the assignment of the task, to a communication device of the emergency response team member.

13. A system, comprising:
    a sensor module that identifies an incident situation based upon receiving an indication from a sensor that an abnormal condition has been detected by the sensor;
    a life safety system connector that queries one or more life safety systems to obtain life safety system data;
    a database connector that queries one or more databases, comprising at least one of equipment information, chemical information, personnel information, or emergency response contingency procedures, to obtain on-site information;
    a module that integrates the life safety system data and the on-site information to generate incident situation information; and
    an electronic display through which the incident situation information is displayed.

14. The system of claim 13, comprising:
    a messaging system that transmits a message to a communication device of an emergency response team member, wherein the message includes a task assignment for the emergency response team member to perform as a response to the incident situation.

15. The system of claim 13, wherein the system is integrated as a life safety system feature into the one or more life safety systems.

16. The system of claim 13, comprising:
    an electronic card reader system that records the personnel information, confirms personnel qualifications, and groups personnel into emergency response team member groups based upon the personnel qualifications.

17. The system of claim 13, wherein the electronic display comprises a first electronic touch screen and a second electronic touch screen, and wherein the incident situation information is used to generate a plurality of user interface screens that can be displayed through the first electronic touch screen and the second electronic touch screen based upon user input navigating amongst the plurality of user interface screens.

18. A non-transitory machine readable medium comprising instructions for performing a method, which when executed by a machine, causes the machine to:
  in response to detecting an incident situation, obtain life safety system data and on-site information associated with the incident situation;
  integrate the life safety system data and the on-site information to generate incident situation information;
  utilize the incident situation information to construct a plurality of user interface screens that can be displayed through an electronic touch screen based upon user input navigating amongst the plurality of user interface screens; and
  display one or more of the user interface screens through the electronic touch screen.

19. The non-transitory machine readable medium of claim 18, wherein the plurality of user interface screens comprises at least one of a first user interface screen of a map populated with a location representation of a location of the incident situation, a second user interface screen of video surveillance imagery of the location, or a third user interface screen of a gas concentration trend chart.

20. The non-transitory machine readable medium of claim 18, wherein the plurality of user interface screens comprises at least one of a first user interface screen of a fire alarm temperature measurement trend chart, a second user interface screen of an incident situation response procedure and task checklist, a third user interface screen of recommended task assignments for a set of emergency response team members, or a fourth screen of at least one of equipment information or chemical information.

* * * * *